(12) United States Patent
Lee et al.

(10) Patent No.: US 12,406,098 B2
(45) Date of Patent: *Sep. 2, 2025

(54) SYSTEMS AND METHODS FOR CLASSIFYING PUF SIGNATURE MODULES OF INTEGRATED CIRCUITS

(71) Applicant: Taiwan Semiconductor Manufacturing Company Limited, Hsinchu (TW)

(72) Inventors: Cheng-En Lee, Hsinchu (TW); Shih-Lien Linus Lu, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,838

(22) Filed: Aug. 9, 2023

(65) Prior Publication Data

US 2023/0385459 A1    Nov. 30, 2023

Related U.S. Application Data

(63) Continuation of application No. 16/785,877, filed on Feb. 10, 2020, now Pat. No. 11,783,092.

(51) Int. Cl.
*G06F 21/73* (2013.01)
*H04L 9/32* (2006.01)

(52) U.S. Cl.
CPC ............ *G06F 21/73* (2013.01); *H04L 9/3278* (2013.01)

(58) Field of Classification Search
CPC ............................. G06F 21/73; H04L 9/3278

USPC ........................................................... 726/34
See application file for complete search history.

(56) References Cited

U.S. PATENT DOCUMENTS

| | | | |
|---|---|---|---|
| 11,005,669 B2 | 5/2021 | O'Connell | |
| 2014/0327468 A1* | 11/2014 | Pfeiffer | H03K 19/003 326/8 |
| 2017/0180140 A1* | 6/2017 | Mai | H04L 9/3278 |
| 2018/0102163 A1* | 4/2018 | Lin | G09C 1/00 |
| 2018/0183614 A1 | 6/2018 | Danger et al. | |
| 2019/0058603 A1 | 2/2019 | Lin et al. | |
| 2019/0378575 A1* | 12/2019 | Lu | G11C 29/50 |
| 2020/0044871 A1* | 2/2020 | Lu | G11C 11/419 |
| 2020/0052913 A1 | 2/2020 | Orshansky | |

(Continued)

FOREIGN PATENT DOCUMENTS

WO    2019/018557    1/2019

OTHER PUBLICATIONS

Chinese Office Action; Application No. 202011286809.7; Dated Jan. 8, 2024.

(Continued)

*Primary Examiner* — Dereena T Cattungal
(74) *Attorney, Agent, or Firm* — Jones Day

(57) ABSTRACT

Systems and method are provided for determining a reliability of a physically unclonable function (PUF) cell of a device. One or more activation signals are provided to a PUF cell under a plurality of conditions. A PUF cell output provided by the PUF cell under each of the plurality of conditions is determined. A determination is made of a number of times the PUF cell output of the PUF cell is consistent. And a device classification value is determined based on the determined number of times for a plurality of PUF cells.

20 Claims, 13 Drawing Sheets

(56) References Cited

U.S. PATENT DOCUMENTS

2020/0084052 A1* 3/2020 O'Connell ............ H04L 9/3278
2020/0210628 A1* 7/2020 Karpinskyy .......... H04L 9/0866
2020/0243122 A1   7/2020 Mahatme et al.

OTHER PUBLICATIONS

German Office Action; Application No. 102020106837.9; dated Feb. 2, 2021.

* cited by examiner

|  | a + delta1 | a + delta2 | a + delta3 | a + delta4 |
|---|---|---|---|---|
| b + delta1 | 0 | 0 | 0 | 0 |
| b + delta2 | 0 | 0 | 0 | 0 |
| b + delta3 | 0 | 0 | 0 | 0 |
| b + delta4 | 0 | 0 | 0 | 0 |

704

|  | a + delta1 | a + delta2 | a + delta3 | a + delta4 |
|---|---|---|---|---|
| b + delta1 | 1 | 1 | 1 | 1 |
| b + delta2 | 1 | 1 | 1 | 1 |
| b + delta3 | 1 | 1 | 1 | 1 |
| b + delta4 | 1 | 1 | 1 | 1 |

706

|  | a + delta1 | a + delta2 | a + delta3 | a + delta4 |
|---|---|---|---|---|
| b + delta1 | 0 | 1 | 0 | 1 |
| b + delta2 | 1 | 0 | 1 | 0 |
| b + delta3 | 0 | 1 | 1 | 1 |
| b + delta4 | 1 | 1 | 1 | 0 |

708

|  | a + delta1 | a + delta2 | a + delta3 | a + delta4 |
|---|---|---|---|---|
| b + delta1 | 0 | 0 | 0 | 1 |
| b + delta2 | 0 | 0 | 0 | 0 |
| b + delta3 | 0 | 0 | 0 | 0 |
| b + delta4 | 0 | 0 | 0 | 0 |

| SM# | SMa | SMb | PUF Output | | | | | | | |
|---|---|---|---|---|---|---|---|---|---|---|
| | | | a | b | c | d | e | f | g | h |
| 1 | 00 | 11 | 1 | 0 | 1 | 1 | 1 | 1 | 0 | 1 |
| 2 | 01 | 11 | 1 | 0 | 1 | 1 | 1 | 1 | 1 | 1 |
| 3 | 10 | 11 | 1 | 0 | 1 | 0 | 0 | 1 | 0 | 0 |
| 4 | 11 | 00 | 0 | 0 | 0 | 0 | 0 | 1 | 0 | 0 |
| 5 | 11 | 01 | 0 | 0 | 1 | 0 | 0 | 1 | 0 | 1 |
| 6 | 11 | 10 | 1 | 0 | 1 | 0 | 0 | 1 | 0 | 1 |
| 7 | 11 | 11 | 1 | 0 | 1 | 1 | 0 | 1 | 0 | 0 |
| | Totals: | | 5 | 0 | 6 | 3 | 2 | 7 | 1 | 4 |

804 →

| Binning Level | | | | | | | |
|---|---|---|---|---|---|---|---|
| 0 | 1 | 2 | 3 | 4 | 5 | 6 | 7 |
| 0 | | | | 1 | | | |
| Logic Type | | | | | | | |
| 5 | 0 | 6 | 3 | 2 | 7 | 1 | 4 |
| 2 | 7 | 7 | 0 | 0 | 0 | 6 | 7 |
| 6 | 2 | 1 | 7 | 3 | 7 | 0 | 0 |
| 2 | 6 | 1 | 7 | 4 | 6 | 0 | 6 |
| 0 | 0 | 0 | 2 | 1 | 2 | 7 | 0 |
| 6 | 6 | 4 | 0 | 7 | 4 | 2 | 7 |
| 7 | 0 | 3 | 4 | 3 | 5 | 7 | 7 |
| 4 | 3 | 7 | 2 | 5 | 7 | 3 | 0 |

FIG. 8

SYSTEMS AND METHODS FOR CLASSIFYING PUF SIGNATURE MODULES OF INTEGRATED CIRCUITS

CROSS-REFERENCE TO RELATED APPLICATION

This application is a continuation of U.S. patent application Ser. No. 16/785,877, filed Feb. 10, 2020, which is incorporated by reference herein in its entirety.

BACKGROUND

A physically unclonable function (PUF) refers to a physical structure that is embodied in a physical device. Today, PUFs are usually implemented in integrated circuits and are typically used in applications with security requirements. Although manufactured in high volume, each integrated circuit (IC) is unique due to the physical randomness even with the same manufacturing process and the same material. This inherent variation can be extracted and used as its unique identification.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram depicting PUF cell masks in accordance with an embodiment.

FIG. 7 is a diagram depicting example PUF cell outputs based on varying simulated stress conditions in an exemplary embodiment.

FIG. 8 is a diagram depicting an example testing of PUF cells using control signals with varied timing therebetween in accordance with embodiments.

DETAILED DESCRIPTION

Figure 1:
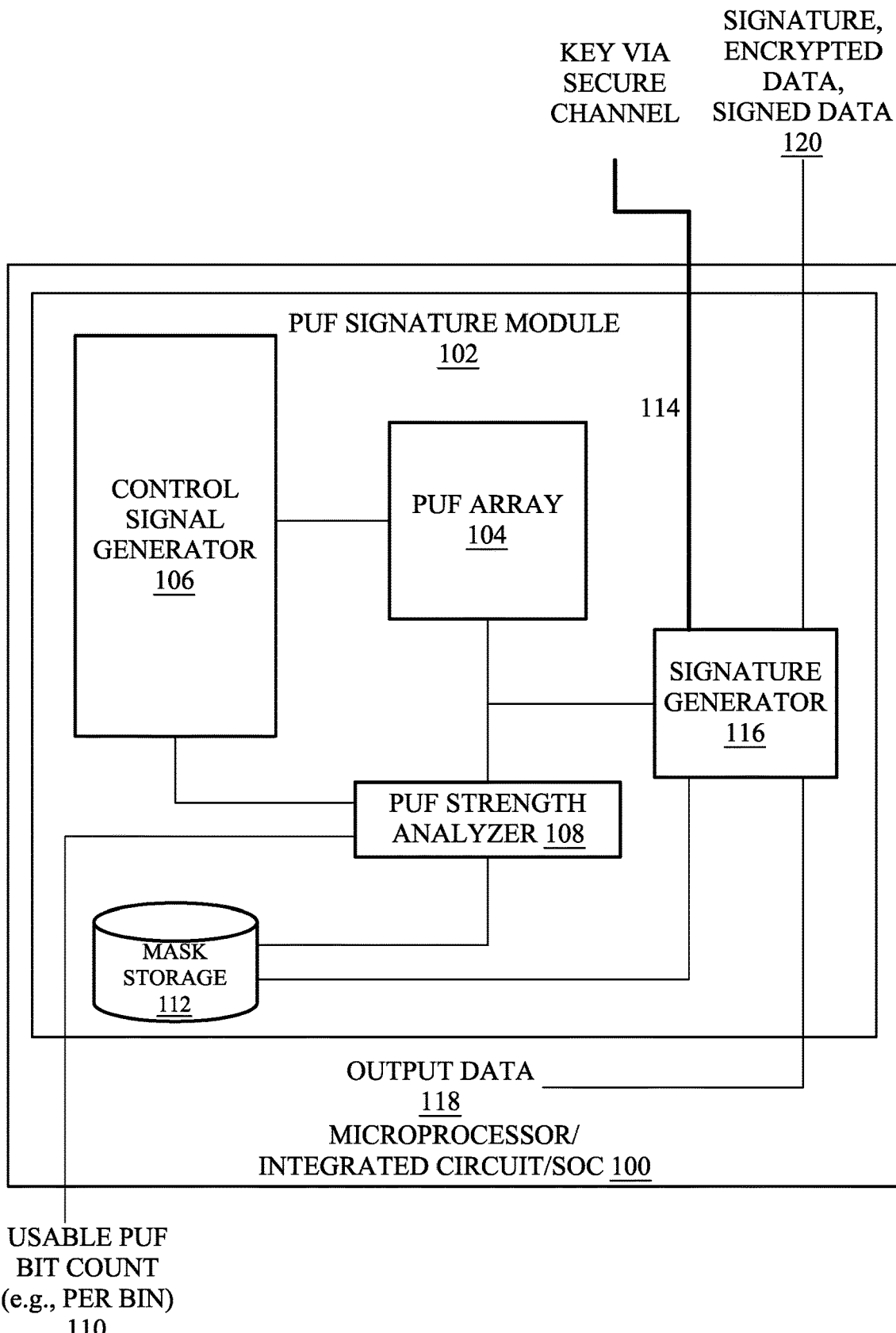
FIG. 1 is a block diagram depicting a testable PUF signature module for producing a PUF signature that identifies an integrated circuit in an exemplary embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

A PUF is a physically-defined "digital fingerprint" that serves as a unique identifier for a semiconductor device such as a microprocessor or an SoC. They are based on unique, typically random physical variations which occur naturally during semiconductor manufacturing. A PUF value can take the form of a string of bits that may be used as a unique or near-unique value to identify a particular device (e.g., in a communication from an Internet of Things (IOT) device), as an encryption key for protecting contents of a transmitted message, or as a digital signature confirming an identity of a device transmitting data as described further herein.

Because a PUF value relies on randomness of a manufacturing process (e.g., different PUF cells providing different bit values based on small variances between two similar-structure transistor arrangements), the behavior and reliability of PUF cells is not known until after device manufacture. In some instances, a PUF cell may provide anomalous or unreliable behavior. For example, when a PUF cell's output is determined by very small differences among manufactured transistors, in instances where those transistors are identical or very nearly identical, the output of that PUF cell may not be reliably the same during every read as desired of a unique identifier. A PUF cell that outputs a 1 value in some instances and a 0 value in others ("a weak bit" or "a dark bit") is typically undesirable. Operational environments (e.g., thermal conditions, supply voltage variations) can produce conditions more likely to cause such undesirable variations. Systems and methods described herein, in embodiments, provide mechanisms for testing PUF cell reliability to identify PUF cells whose bit values are unlikely to change ("strong bits") even under operational environment stresses. In addition, systems and methods as described herein can classify bits according to how strong or weak those bits are, where bits may be deemed unusable for certain types of operations (e.g., high security, extreme operating conditions (e.g., high or low temperature)) but usable for others based on strength levels associated with those bits.

FIG. 1 is a block diagram depicting a testable PUF signature module for producing a PUF signature that identifies a microprocessor/integrated circuits/SoC 100 in an exemplary embodiment. The PUF signature module 102 includes a PUF array 104 that, in embodiments, comprises an array of PUF cells, a value of each PUF cell being dependent on manufacturing process variations such that PUF arrays of different PUF signature modules 102 produce different signatures. The PUF array 104 may be of differing sizes (e.g., 8×8, 16×16, 16×32, 64×64), with larger arrays providing longer signatures that are more likely to be unique and harder to replicate (e.g., crack).

The PUF signature module 102 includes certain components for testing the reliability of cells of the PUF array 104. In the example of FIG. 1, a control signal generator 106 is configured to provide activation signals to PUF cells in the PUF array 104. In embodiments, the control signal generator 106 is configured to provide those activation signals in different modes. In one mode (e.g., an operational mode), the control signal generator 106 provides activation signals to inputs of a PUF cell simultaneously, in synchronization. In a second mode (e.g., a testing mode), the control signal generator 106 provides activation signals to inputs of the PUF cell at varying times (e.g., to one input of the PUF cell shortly after an input to another input of the PUF cell), out of synchronization, to simulate stress on the PUF cell. A PUF strength analyzer 108 can in embodiments command the generator 106 to provide control signals to the PUF array 104 and evaluates outputs of the PUF cells based on those controls signals. If the PUF cell provides inconsistent output values across the different control modes provided by the control signal generator 106, then the PUF strength analyzer 108 may deem the PUF cell to be a weak bit that is not sufficiently reliable for use in the unique signature produced by the PUF array 104. Additionally, the PUF strength analyzer 108 may determine a strength level of the PUF cell based on a number of times the PUF cell provides consistent output across the different control modes (e.g., a highest strength level when consistent 100 out of 100 tests, a high strength level when consistent 95-99 out of 100 tests, an adequate strength level when consistent 85-94 out of 100 tests, an unusable status when consistent fewer than 85 out of 100 tests).

The PUF signature module 102 may operate in a variety of modes. In a first testing mode, the module 102 tests the cells of the PUF array 104 to determine a number of PUF cells that are sufficiently reliable for use as a device identifier. In that testing mode, as controlled by the PUF strength analyzer 108, the control signal generator 106 may provide input signals to a PUF cell with varying timing (e.g., in synchronization, out of synchronization). The PUF strength analyzer 108 monitors output of the PUF cell to see whether it changes based on simulated stress conditions. Changed outputs may result in the analyzer 108 deeming that PUF cell a weak cell. For each PUF cell, the PUF strength analyzer 108 determines a number of consistent outputs across a series of tests (e.g., multiple tests in an operational mode, multiple tests in stress simulation mode, a mixture of tests in both operational and simulation mode). The PUF strength analyzer 108 determines a strength level associated with each PUF cell based on its determined number of consistent outputs. The PUF strength analyzer 108 tracks a strength level associated with PUF cells and outputs a usable PUF bit count 110 (e.g., according to bins, such as: k PUF cells in a highest strength level bin, l PUF cells in a high strength level or better bin, m PUF cells in an adequate or better bin, n unusable cells; k PUF cells in a highest strength level bin, l PUF cells in a high strength level bin, m PUF cells in an adequate bin, n unusable cells).

The usable PUF bit count 110 may be used as a qualification or a classification value for the PUF signature module 102. For example, the PUF signature module 102 may be deemed failed when the usable PUF bit count 110 of an adequate or better bin is less than a threshold number. Or the PUF signature module 102 may be assigned a classification based on the usable PUF bit count 110. For example, for a 1024 bit (32×32) PUF array 104, the module 102 may be deemed approved for high security applications (e.g., where sensitive data is to be transmitted using encryption, where confirmation of identity of the module 102 is of critical importance, military applications) when the usable PUF bit count of a high strength level or better bin is greater than 999. In that example, the module 102 may be deemed approved for lower security operations (e.g., for an IOT application such as a refrigerator or other appliance, a television) when the usable PUF bit count 110 for an adequate or better bin is greater than 799. The module 102 may be identified as failed when the count 110 for the adequate or better bin is less than 800.

In a second, initialization mode the control signal generator 106 again on control of the PUF strength analyzer 108 provides control signals to the PUF array 104 in both an operation-like mode (e.g., in synchronization) and stress mode (e.g., out of synchronization), where the PUF strength analyzer 108 monitors the PUF array 104 to identify weak PUF cells (e.g., PUF cells whose output changes under simulated stress conditions) to create a mask data record stored at the mask storage 112 that identifies PUF cells that are deemed too unreliable for use in generating the unique identifier of the module 102. In embodiments, the PUF strength analyzer 108 generates a plurality of masks and stores those masks in the non-transitory mask storage 112. For example, the PUF strength analyzer 108 may generate a first mask that masks all PUF cell outputs except those in a highest strength level bin, a second mask that masks all PUF cell outputs except those in either of the high strength bin or the highest strength level bin, and a third mask that masks all PUF cell outputs except those in any of the adequate, high, or highest strength level bins.

In embodiments, the PUF signature module 102 may be enabled to selectively operate (e.g., based on a control signal received by the integrated circuit) in one of multiple modes of operation, where the first mask is used in a first operational mode, the second mask is used in a second operational mode, and the third mask is used in a third operational mode. In embodiments, the PUF signature module 102 may be limited in which operational modes it is permitted to operate. For example, the module 102 may only be able to operate in the first mode when more than a first threshold number of PUF cells are in the highest strength level bin, and the module 102 may only be able to operate in the second mode when more than a second threshold number of PUF cells are in ether the highest or high strength level bins.

Figure 2:
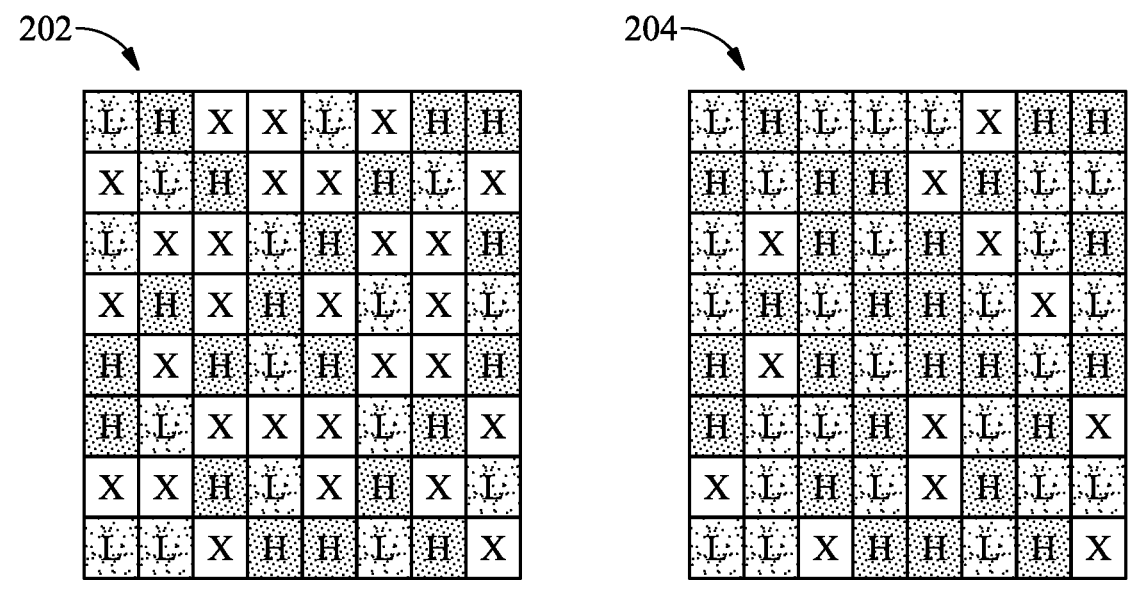

FIG. 2 is a diagram depicting PUF cell masks in accordance with an embodiment. The masks are for a 64 bit (8×8) PUF array. A first mask 202 identifies PUF cells that are in the highest strength level bin. PUF cells having an X indicator were determined to not be sufficiently reliable for use when highest strength PUF cells are desired. A second mask 204 identifies cells that are in the high level strength bin or the highest level strength bin. The second mask 204 identifies a super-set of those identified in the first mask as usable (e.g., for less security-sensitive operations, for operations in less harsh environments). PUF cells having an X indicator were determined to not be sufficiently reliable for use when high strength PUF cells are desired.

With reference back to FIG. 1, following generation of the mask(s) and storage at the mask storage 112, the PUF signature module 102 is ready to output its unique identifier (e.g., via a secure channel 114). Specifically, the control signal generator 106 activates the PUF array 104 using operation-mode control signals (e.g., signals in synchronization), with the resulting PUF cell values being provided to a signature generator 116. The signature generator 116 accesses the mask (e.g., an appropriate one of multiple stored masks based on a mode of operation of the circuit) from the mask storage 112 and disregards PUF cell values from bits identified as unreliable (e.g., for the selected mode of operation) by the mask. The signature generator 116 transmits the resulting signature to a recipient that then associates the signature to the particular PUF signature module 102. The signature transmission may be performed in a variety of ways, such as via a secure pin(s) that is disabled (e.g., by blowing a fuse) after outputting of the signature, or in encrypted form using a public key of the receiving device. In some lower security examples, the signature may be output in plain form via an unsecure channel.

With the signature of the module 102 now associated with the module, the signature can then be used in operational mode. In operational mode, the PUF signature module 102 regenerates its signature (e.g., one time on integrated circuit start up, at the start of each integrated circuit external communication), with the control signal generator 106 providing operation control signals (e.g., in synchronization) to the PUF array, with the signature generator 116 generating the signature from the PUF array 104 output, disregarding unreliable PUF cells identified by a mask accessed from the mask storage 112.

The signature is then used to authenticate the integrated circuit. In an example, a challenge is provided to the integrated circuit, an a response is provided by the integrated circuit using the signature to authenticate that the integrated circuit is a truthful device. In another example, the signature is used to encrypt information for communication between a server and a device that includes the integrated circuit. For example, the signature can be used to encrypt data 118 from the integrated circuit or system on chip to entities outside of the microprocessor/IC/SoC 100. In one example, the data is signed by the signature generator 116 using the signature such that the recipient of the signed data can verify the source of that data. In another example, the signature generator 116 encrypts the output data 118 using the signature, such that the encrypted data can be decrypted by a recipient who has previously received and associated the signature with the integrated circuit on which the PUF signature module 102 resides.

Figure 3:
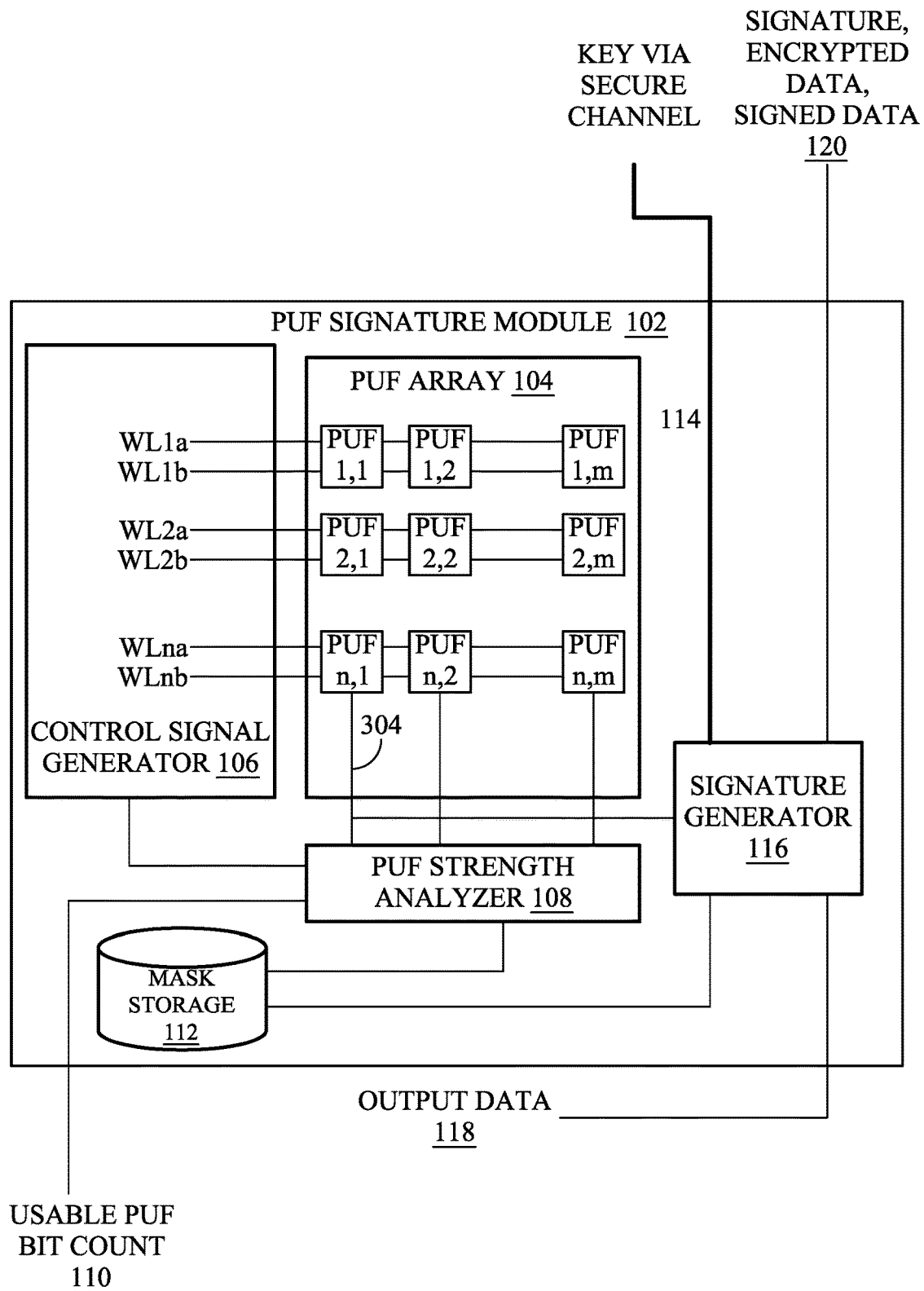
FIG. 3 is a diagram depicting a control signal generator sending control signals to cells of a PUF array in accordance with an embodiment.

FIG. 3 is a diagram depicting a control signal generator sending control signals to cells of a PUF array in accordance with an embodiment. The PUF array comprises a plurality of PUF cells 1, 1, . . . , n, m arranged into n rows and m columns. Each PUF cell receives two input signals (e.g., start_1a, start_1b is received by PUF cells, 1,1; 1,2; . . . 1,m) and provides an output signal via a bit line (e.g., out_a 304). The control signal generator 106 provides control signals to activate PUF cells of a row of the PUF array 104 at the same time. The PUF strength analyzer is configured to determine a PUF cell value based on a signal level on the bit line (e.g., PUF bit is a 1 when out_a 304 is high, PUF bit is a 0 when out_a 304 is low).

To generate a signature for the PUF signature module 102, the control signal generator 106 activates the PUF cells of the array 104 row by row to determine whether the PUF cells of that row are high or low value. The signature generator 116 captures those high/low PUF cell outputs, and may ignore PUF cell bits as instructed by a mask accessed from the mask storage 112 to determine the integrated circuit signature.

Figure 4:
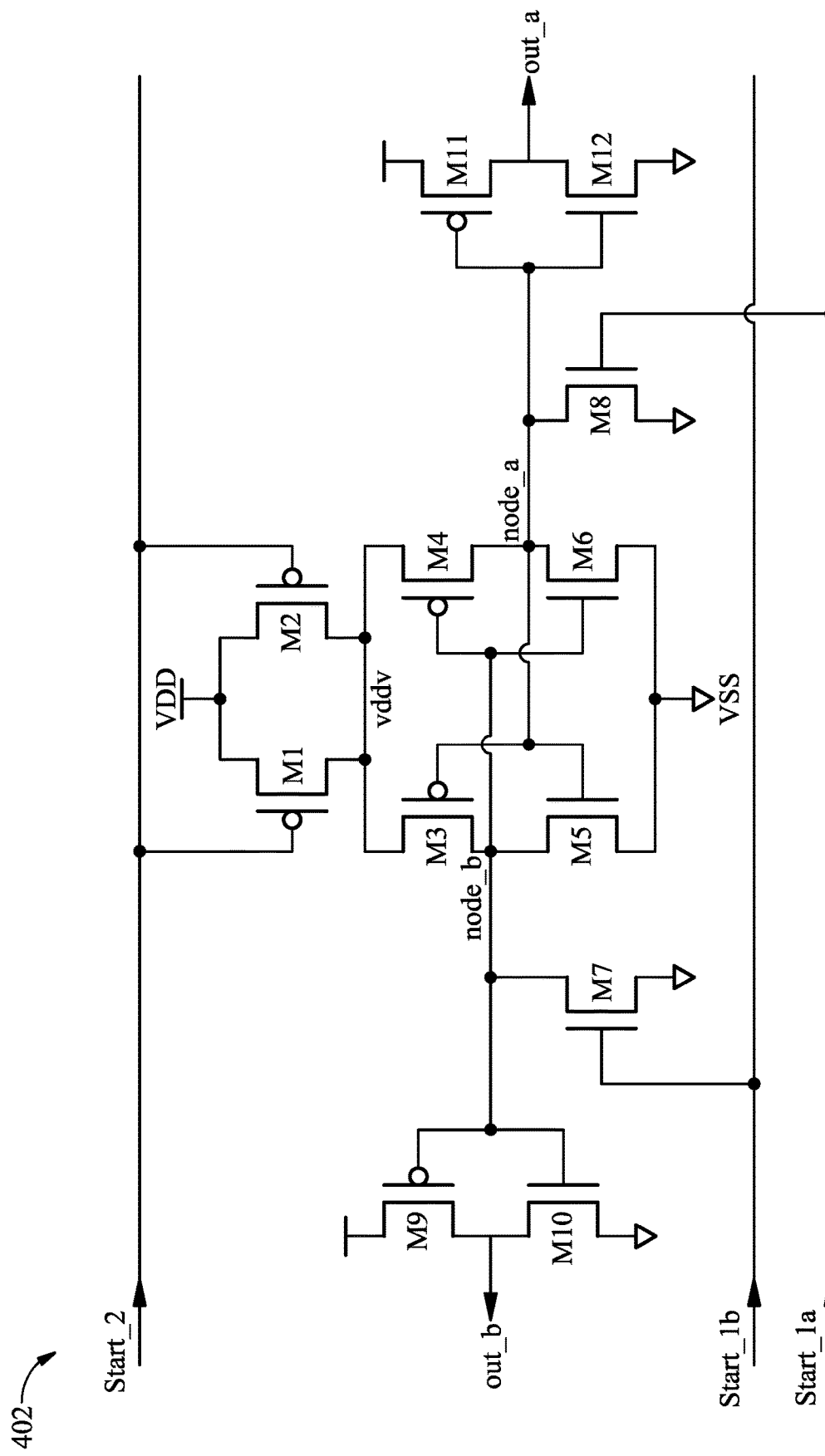
FIG. 4 is a diagram depicting an example structure of a of PUF cell in an exemplary embodiment.

PUF cells, whose value varies based on manufacturing process variances, may take a variety of forms. FIG. 4 is a diagram depicting an example structure of a PUF cell in an exemplary embodiment. Each cell 402 includes two similarly structured inverters (e.g., M3/M5; M4/M6). PUF cell 402 receives two input signals start_1b, start_1a after the top vddv node of the inverters is pre-charged via an active low start_2 signal. In operation, when start_1a and start_1b are provided to the PUF cell 402 in synchronization, the PUF cell outputs out_A at a high level if the left inverter (M3/M5) is stronger and a low level if the right inverter (M4/M6) is stronger.

Figure 5:
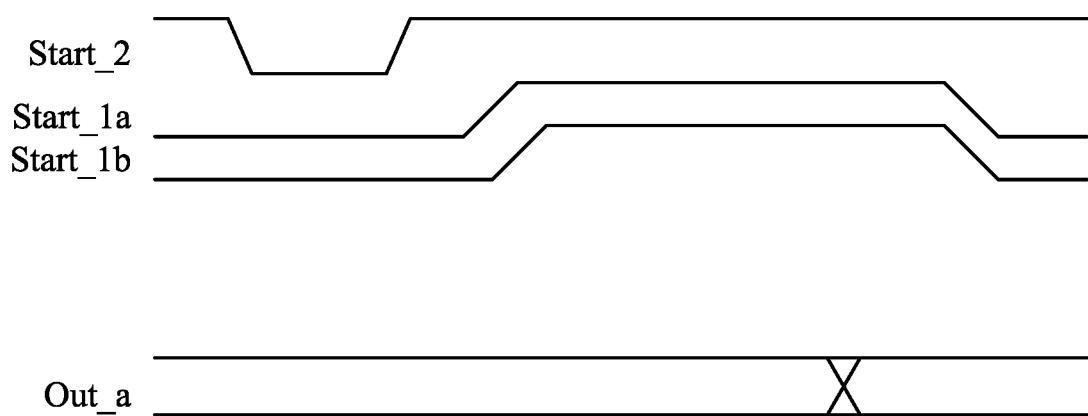
FIG. 5 is a timing diagram depicting signals received and produced via PUF cell when its input signals are provided in synchronization in an exemplary embodiment.

FIG. 5 is a timing diagram depicting signals received and produced via PUF cell 402 when its input signals are provided in synchronization in an exemplary embodiment. As discussed above, control signals (start_1a, start_1b) are provided to the inputs of the PUF cell in synchronization (i.e., at the same or substantially the same time) to determine a base PUF cell value in a testing mode or to determine a PUF cell value in an operational mode. A pre-charge signal (start_2) goes low, which charges node vddv to a high level. The control signals start_1a, start_1b are brought high at the same time, which activates the transistors M7, M8. The transition of signals at node_a, node_b induces a tug of war between the two inverters (left inverter M3/M5; right inverter M4/M6), with a stronger inverter pulling its corresponding output (left output out_b, right output out_a) low. A PUF cell output can be determined by monitoring one of those outputs (e.g., out_a). Following sensing of a PUF cell value for cell 402, the control signal generator 106 can pre-charge the vddv node and activate PUF cells in subsequent rows of the PUF cell array 104 via similar control lines.

Figure 6:
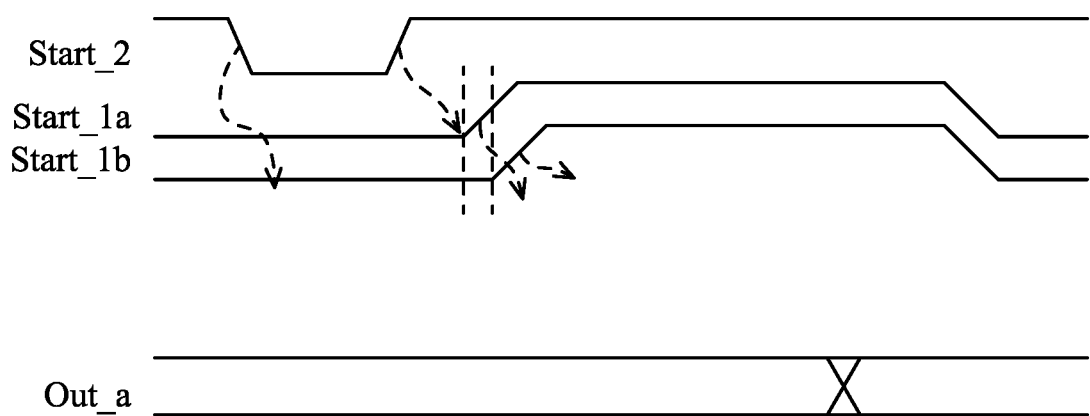
FIG. 6 is a timing diagram depicting signals received and produced via a PUF cell when its input signals are provided out of synchronization in an exemplary embodiment.

As noted above, the control signal generator 106 can simulate stress on PUF cells by providing control signals out of synchronization. FIG. 6 is a timing diagram depicting signals received and produced via PUF cell 402 when its input signals are provided out of synchronization in an exemplary embodiment. As in the example of FIG. 5, a pre-charge signal (start_2) is activated low to charge the vddv node. The control signal generator 106 again activates PUF cell 402 by bringing input signals start_1a, start_1b high. But in this example, the control signal generator 106 activates control signal start_1b, controlling right inverter M4/M6, a short time (e.g., 1 ms, 2 ms, 1 μs, 2 μs, 1 ns, tens of ps) later than control signal start_1a is activated. Upon receiving their respective activation signals, the inverters begin pulling their respective bit lines. Based on stress simulated by the providing of control signals start_1a, start_1b, the PUF cell output may change, depending on the strength of the PUF cell.

During a testing mode, to generate a useable PUF cell count 110 (e.g., for one or more bins), or during an initialization mode when a PUF cell mask(s) is generated for storage at the mask storage 112, the control signal generator 106 may test the PUF cells under a variety of simulated stress conditions. FIG. 7 is a diagram depicting example PUF cell outputs based on varying simulated stress conditions in an exemplary embodiment. In each of the depicted tables, the control signal generator 106 is configured to simulate stress on the PUF cells by delaying each of the control signals (e.g., start_1a, start_1b) based on each of delta1, delta2, delta3, and delta4 (e.g., 0 ps, 10 ps, 20 ps, 30 ps) for a total of sixteen combinations of stress simulation delays. PUF cell outputs are tracked across those sixteen tests (4 synchronously where the control signals are provided at the same time in the diagonal entries, six times where the first control signal start_1a is activated first, and six times where the second control signal start_1b is activated first), with those outputs being displayed in the tables. In a first table 702, the PUF cell outputs a low (0) value in all sixteen tests. This is indicative of a strong PUF cell (e.g., one placed in a highest strength bin). Similarly in the second table 704, the PUF cell outputs a high (1) value in all sixteen tests, again indicating a strong PUF cell. In the third table 706, the PUF cell provides varying outputs, even providing different outputs when receiving control inputs in synchronization (i.e., a 0 is output when both input signals are delayed, delta1, delta2, and delta4 but a 1 is output when both input signals are delayed by delta3). This table is indicative of a weak PUF cell bit that should be disregarded in generating a device identifier. The fourth table 708 indicates a PUF cell that provides a low (0) output value in all cases except for where control line start_1a is delayed delta4 relative to control line start_1b. In some implementations, this may be a significant enough anomaly to identify the PUF cell as weak and include it in a mask of bits to be disregarded. In some instances, this anomaly may be deemed by the PUF strength analyzer 108 to be of insufficient concern (e.g., based on a combination of pre-defined criteria) for identification of an unreliable cell (e.g., the PUF cell is placed in the high strength or adequate strength bins).

Determining strength levels of PUF cells may be accomplished in a variety of ways. FIG. 8 is a diagram depicting an example testing of PUF cells using control signals with varied timing therebetween in accordance with embodiments. Each of 8 PUF cells, labeled a-h in table 802, are tested seven times using input signals having their relative timing varied according to control signals SMa, SMb. PUF cell outputs are determined for each PUF cell during each test to determine a number of times the PUF cell outputs remain consistent. Consistency may be ascertained by summing the PUF cell outputs over the seven tests. A zero count (e.g., as exhibited by PUF cell b) indicates the PUF cell provided a consistent value (i.e., 0) over all of the tests. Similarly, a seven count (e.g., as exhibited by PUF cell f) indicates the PUF cell provided a consistent value (i.e., 1) over all of the tests. Other PUF cells provided less consistent results (e.g., PUF cell c provided a 1 output six times, PUF cell g provided a 0 output six times). PUF cells with two and five counts were less reliable (e.g., PUF cells a and e), outputting inconsistent values two out of seven times, while PUF cells with 3 and 4 counts (e.g., PUF cells d and h) are least desirable and may be identified as unusable in all cases in some embodiments. PUF cell sums across seven tests for a 64 bit PUF cell array are shown at table 804, where a first row of the table 804 corresponds to the tests illustrated in FIG. 8 at table 802. As indicated at the top of table 804, PUF cells having 0, 1, 2, and 3 values typically output low values, while cells having 4, 5, 6, and 7 values in the table typically output high values.

Figure 9:
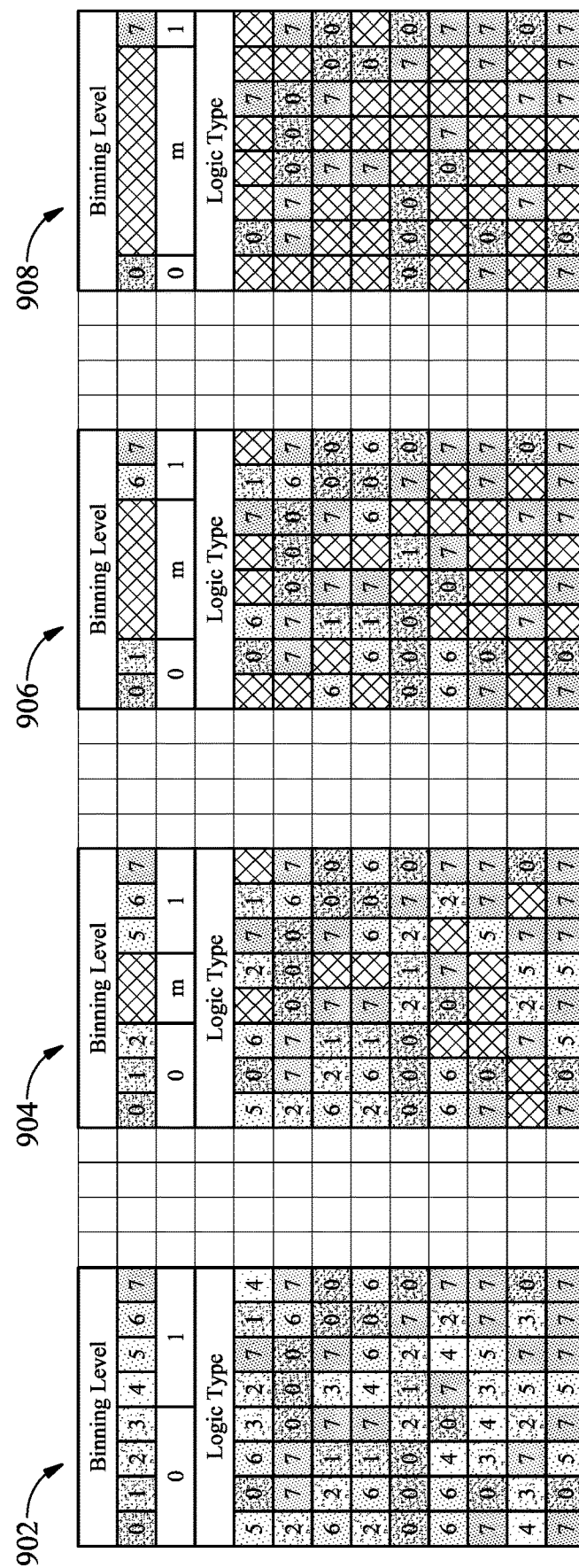
FIG. 9 is a diagram depicting PUF cell binning by strength, such as for use in identifying appropriate applications for the device, in accordance with embodiments.

As noted above, PUF cells may typically output a particular 0 or 1 value during normal operations, but under stress may output an anomalous value. The table 802 is indicative of how likely a PUF cell is to output an anomalous value. Highest strength cells (e.g., those indicated by 0, 7) are unlikely to output anomalous values even under extreme conditions (e.g., inside a rocket engine). While high strength cells (e.g., those indicated by 1, 6) may exhibit anomalous behavior under extreme conditions, they may be sufficiently reliable for many less harsh/secure applications (e.g., in a IOT refrigerator). FIG. 9 is a diagram depicting PUF cell binning by strength, such as for use in identifying appropriate applications for the device, in accordance with embodiments. A base PUF strength data structure is depicted at FIG. 9 that contains values indicative of a number of consistent outputs provided by each PUF cell across seven tests. A first mask record of a mask data structure is depicted at table 904. The first mask enables use of PUF cells having an adequate or better classification for use in generating a device signature. PUF cells with values of 3, 4 are deemed unreliable/unusable and are indicated as such in the mask record. Twelve of 64 cells are marked as unusable in the first mask. A second mask at table 906 identifies PUF cells that are high strength or better. PUF cells with values of 2, 3, 4, 5 are deemed unreliable/unusable for operations where high strength PUF cells are desirable. Twenty-five of 64 cells are marked as unusable in the second mask. A third mask at table 908 identifies PUF cells that are highest strength or better. PUF cells with values of 1, 2, 3, 4, 5, 6 are deemed unreliable/unusable for operations where highest strength PUF cells are desirable. Twenty-nine of 64 cells are marked as unusable in the third mask.

An integrated circuit may be classified based on a number of PUF cells of different strengths existing in its arrays. For example, a circuit may be qualified for adequate strength operations when more than 35 PUF cells of at least adequate strength are present (e.g., cells not masked in table 904). The circuit may be qualified for high strength operations when more than 35 PUF cells of at least high strength are present (e.g., cells not masked in table 906). And a circuit may be qualified for highest strength operations when more than 35 PUF cells of at least highest strength are present (e.g., cells not masked in table 908). The circuit of FIG. 9 would be classed as usable for high strength operations because the threshold number of bits is met in high strength table 906, but there are not 35 highest strength bits indicated in table 908.

Figure 10:
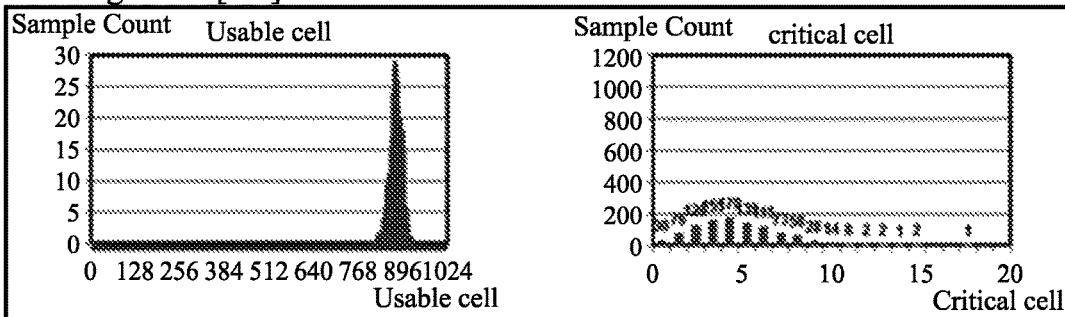
FIG. 10 depicts usable cells at different binning levels and simulated behaviors of corresponding PUF cells in accordance with embodiments.
Figure 10:
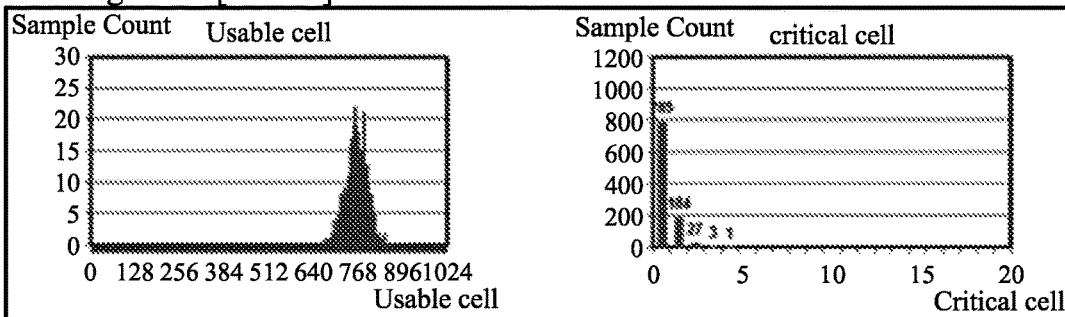
Figure 10:
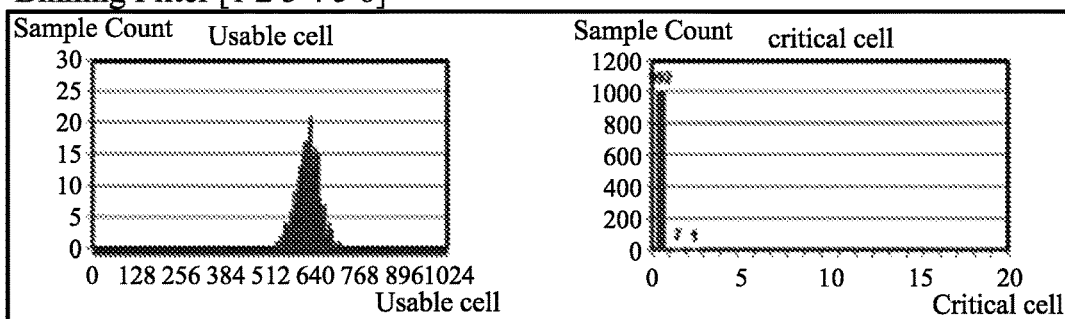
Figure 10:
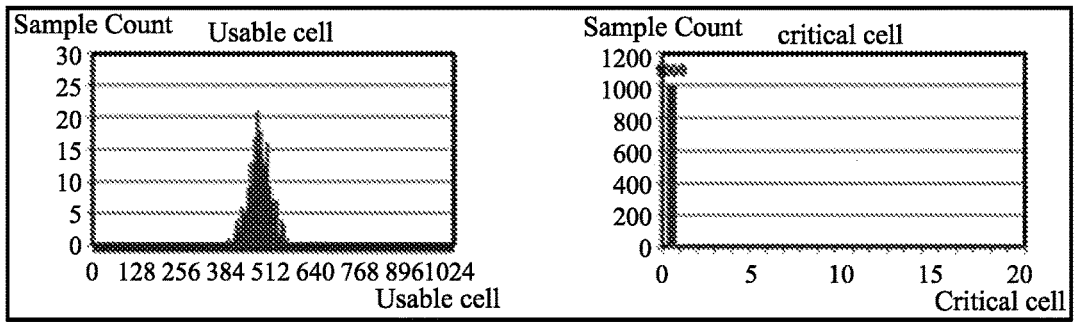

FIG. 10 depicts simulated usable cells at different binning levels and simulated behaviors of corresponding PUF cells in accordance with embodiments. In a first set of graphs for adequate strength PUF cells, PUF cells having values of 3, 4 in a PUF cell output count data record are deemed unusable. Over 1000 simulations of seven input signal timing variations, at least 818 PUF cell bits were identified as having adequate strength. Those 818 PUF cell bits were then simulated under operational conditions (e.g., varying temperature, supply voltage). As illustrated in the right graph, in 23.2% of operational simulations, 0, 1, or 2 bits exhibited anomalous behavior. This means that only 23.2% of the time, the device identifier could be reconstructed using two bit forward error correction. This may be deemed unacceptable for the simulated operational conditions.

In a second set of graphs for high strength PUF cells, PUF cells having values of 2, 3, 4, 5 in a PUF cell output count data record are deemed unusable. Over 1000 simulations of seven input signal timing variations, at least 670 PUF cell bits were identified as having adequate strength. Those 670 PUF cell bits were then simulated under operational conditions. As illustrated in the right graph, in 99.6% of operational simulations, 0, 1, or 2 bits exhibited anomalous behavior. This means that the device identifier could be reconstructed using two bit forward error correction in all but 0.4% of the time. This may be deemed acceptable in many instances for the simulated operational conditions.

In a third set of graphs for highest strength PUF cells, PUF cells having values of 1, 2, 3, 4, 5, 6 in a PUF cell output count data record are deemed unusable. Over 1000 simulations of seven input signal timing variations, at least 530 PUF cell bits were identified as having adequate strength. Those 530 PUF cell bits were then simulated under operational conditions. As illustrated in the right graph, in 100% of operational simulations, 0, 1, or 2 bits exhibited anomalous behavior. This means that the device identifier could be reconstructed using two bit forward error correction in all cases. This may be deemed acceptable in many instances for the simulated operational conditions.

In a fourth set of graphs, an even higher threshold of PUF cell performance during pre-testing is used (i.e., using more than seven stress-simulation tests). In the fourth example, all but 382 PUF cells are deemed insufficiently strong for use. As illustrated in the right graph, in 100% of operational simulations, 0 bits exhibited anomalous behavior. This provides high confidence that the 382 PUF cells will perform properly under all expected conditions. While this scenario provides high confidence in PUF cell performance, it limits the number of cells available to provide a device identifier, which may result in less secure performance. Thus in instances where inexpensive forward error correction (e.g., two bit FEC) is available, the third level of PUF cell strength may be preferable for providing near 100% device identification performance.

Figure 11:
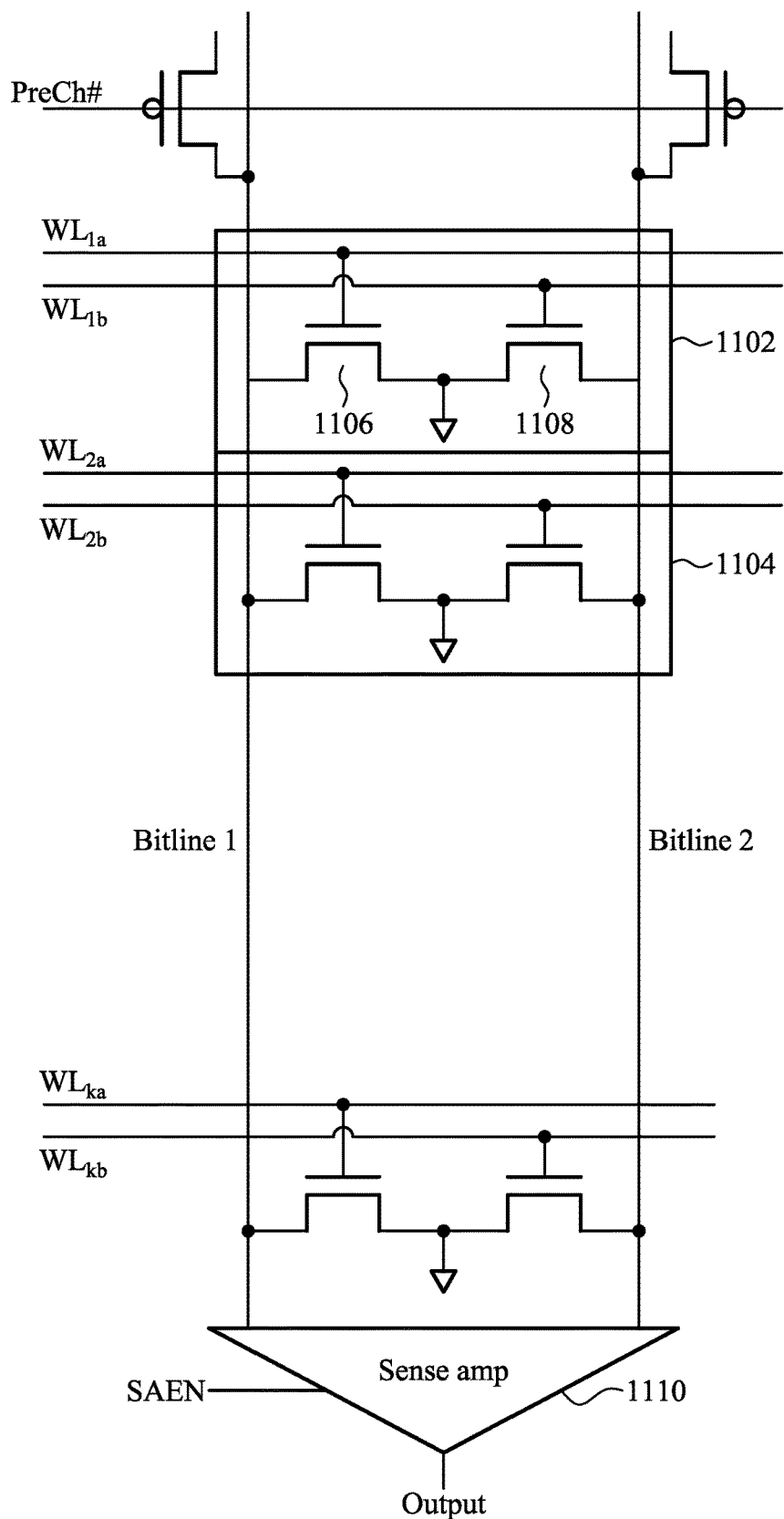
FIG. 11 is a diagram depicting an example structure of a column of PUF cells in an exemplary embodiment.

As noted above, PUF cells may take a variety of forms, including forms where multiple activation input signals can be provided in synchronization and out of synchronization to simulate operation stress conditions. FIG. 11 is a diagram depicting an example structure of a column of PUF cells in an exemplary embodiment. Each cell (e.g., 1102, 1104) includes two similarly structured transistors (e.g., NMOS transistors 1106, 1108 for PUF cell 1102). PUF cell 1102 receives two input signals WL1a, WL1b, where input signal WL1a controls the gate of transistor 1106 and input signal WL1b controls the gate of transistor 1108. One terminal of each transistor 1106, 1108 is connected to a bit line (i.e., transistor 1106 is connected to Bitline1 (BL #) and transistor 1108 is connected to Bitline2 (BL)), with the other terminal being connected to a common, ground node.

In an operational mode, the activation input signals are provided to a cell simultaneously. Specifically, a pre-charge signal (PreCh #) goes low, which charges the two bit lines to a high level. The control signals WL1a, WL1b are brought high at the same time, which activates the transistors 1106, 1108. The now-active transistors 1106, 1108 pull the bit lines low. But process variations (e.g., slight differences in fabricated structure between transistors 1106, 1108) cause the transistors 1106, 1108 to pull the bit lines low at slightly different rates (e.g., transistor 1108 pulls Bitline 1 low faster than transistor 1106 pulls Bitline 2 low). During the transition of the bit lines, the sense amplifier 1110 is activated via a sense amp enable signal SAEN. The sense amplifier 1110 is configured to detect a difference between signal levels on the bit lines on activation and to force the bit line that is at a higher level to a high level and the bit line that is at a lower level to a low level. The sense amplifier 1110 outputs a corresponding data value (Output) for the PUF cell based on which of the bit lines was forced to the high level (e.g., a high (1) value if Bitline 1 is forced high, a low (0) value if Bitline 2 is forced high). Following sensing of a PUF cell value for cell 1102, the control signal generator 106 can pre-charge the bit lines again and activate PUF cell 1104 via control lines WL2a, WL2b in a similar fashion, with a PUF cell value for cell 1104 being determined in conjunction with the sense amplifier 1110, with subsequent rows of PUF cells being similarly activated and detected.

As with the example PUF cell structure of FIG. 4, operational stress conditions can be simulated by providing the activation control signals out of synchronization (e.g., 10 ps, 20 ps, 1 ns, 2 ns). The PUF strength analyzer 108 can monitor any inconsistent behavior of a PUF cell across those simulated stress conditions to assess strength of that PUF cell as described above.

Figure 12:
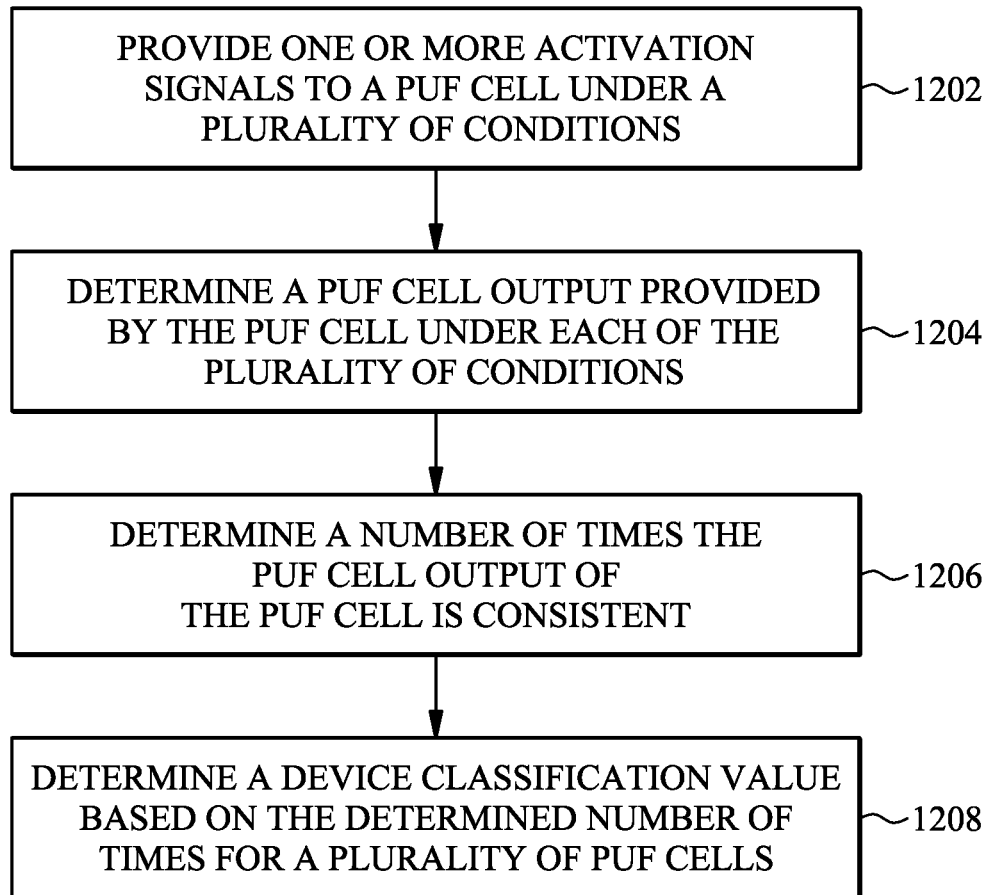
FIG. 12 is a flow diagram depicting a process for determining a reliability of a physically unclonable function cell of a device in accordance with embodiments.

FIG. 12 is a flow diagram depicting a process for determining a reliability of a physically unclonable function cell of a device in accordance with embodiments. The steps of the method are described with reference to structure of previous figures, but it is understood that these steps are applicable to many other structures as well. One or more activation signals (e.g., start_1a, start_1b) are provided to a PUF cell under a plurality of conditions (e.g., a+delta1, a+delta2, b+delta1, b+delta2) at step 1202. A PUF cell output provided by the PUF cell under each of the plurality of conditions is determined at step 1204 (e.g., as depicted in FIG. 8 at table 802). A determination is made at step 1206 of a number of times the PUF cell output of the PUF cell is consistent (e.g., as depicted in FIG. 8 at table 804). And a device classification value is determined at step 1208 based on the determined number of times for a plurality of PUF cells (e.g., as described with reference to FIG. 9).

Figure 13:
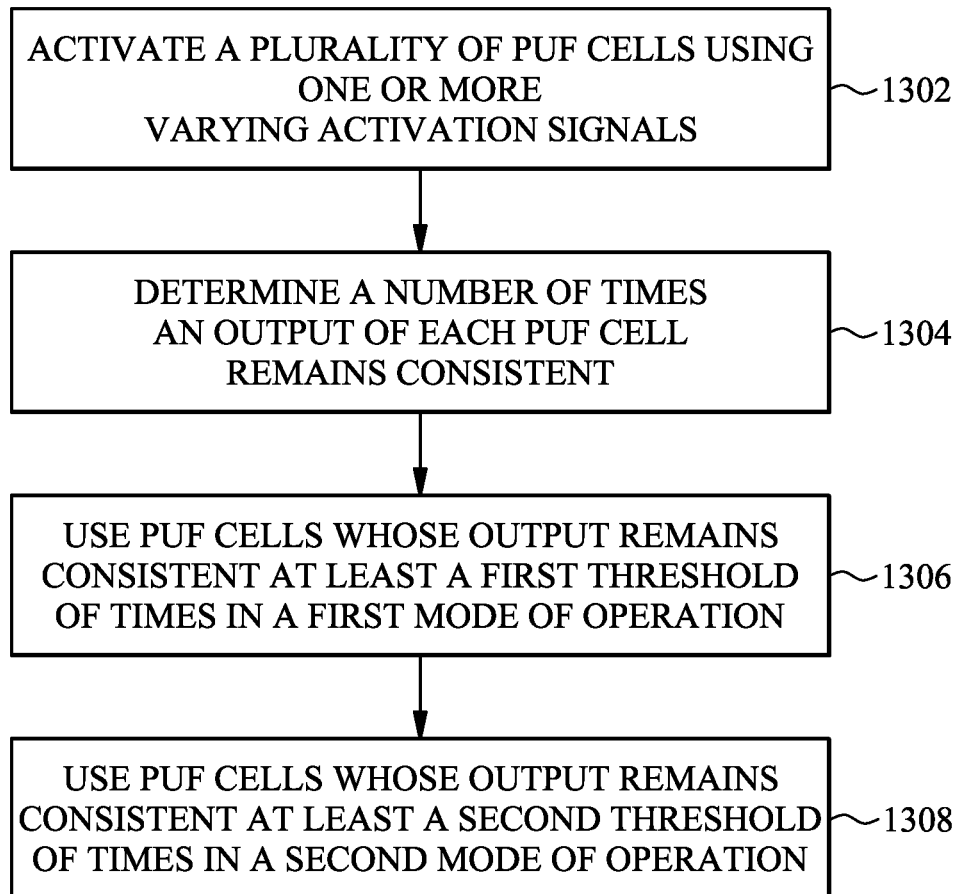
FIG. 13 depicts steps of a method of operating an integrated circuit device in accordance with embodiments.

FIG. 13 depicts steps of a method of operating an integrated circuit device in accordance with embodiments. The steps of the method are described with reference to structure of previous figures, but it is understood that these steps are applicable to many other structures as well. The method includes activating a plurality of PUF cells (e.g., PUF 1,1; PUF 1,2; PUF n,m) using one or more varying activation signals (e.g., a+delta1, a+delta2, b+delta1, b+delta2) at step 1302. At step 1304, a number of times an output of each PUF cell remains consistent across the plurality of operations is determined (e.g., as depicted in FIG. 8 at table 804). PUF cells whose output remains consistent at least a first threshold number of times are used in a first mode of operation at step 1306 (e.g., as described with reference to FIG. 9). And PUF cells whose output remains consistent at least a second threshold number of times are used in a second mode of operation at step 1308 (e.g., as described with reference to FIG. 9).

According to some embodiments, systems and method are provided for determining a reliability of a physically unclonable function (PUF) cell of a device. One or more activation signals are provided to a PUF cell under a plurality of conditions. A PUF cell output provided by the PUF cell under each of the plurality of conditions is determined. A determination is made of a number of times the PUF cell output of the PUF cell is consistent. And a device classification value is determined based on the determined number of times for a plurality of PUF cells.

In embodiments, a device configured to provide a physically unclonable function (PUF) value includes a plurality of PUF cells, each configured to provide a PUF contribution to the PUF value, each of the PUF cells being responsive to a first signal line and a second signal line. A control signal generator is configured to provide signals to the first control line and the second control line in both a synchronized manner and an asynchronous manner to identify cell strengths based on a number of times PUF cell values change based on variations in timing of signals on the first control line and the second control line.

In another embodiment, a method of operating an integrated circuit device includes activating a plurality of PUF cells using one or more varying activation signals. A number of times an output of each PUF cell remains consistent across the plurality of operations is determined. PUF cells whose output remains consistent at least a first threshold number of times are used in a first mode of operation. And PUF cells whose output remains consistent at least a second threshold number of times are used in a second mode of operation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
providing signals to a cell under a plurality of conditions;
under a first condition of the plurality of conditions, providing a first signal to a first wordline connected to a gate terminal of a first transistor within a first branch of the cell and a second signal to a second wordline connected to a gate terminal of a second transistor within a second branch of the cell;
determining a number of times that cell outputs of the cell are consistent under the plurality of conditions; and
determining a device classification value, based on a comparison between the determined number of times and a threshold number or range, for a plurality of cells.

2. The method of claim 1, further comprising:
under a second condition of the plurality of conditions, providing a third signal to the first branch and a fourth signal to the second branch, the third and fourth signals being provided in synchronization;
determining a first cell output of the cell produced by the first signal and the second signal; and
determining a second cell output of the cell produced by the third signal and the fourth signal.

3. The method of claim 1, further comprising determining that the cell is unusable when the number of times that cell outputs of the cell are consistent is fewer than a minimum threshold number.

4. The method of claim 3, wherein the minimum threshold number is based on a number of cell outputs of the cell.

5. The method of claim 1, further comprising determining that the cell is usable for a first class of operation when the number of times that cell outputs of the cell are consistent is at least a first threshold number.

6. The method of claim 5, wherein the first threshold number is equal to a number of cell outputs of the cell.

7. The method of claim 5, further comprising determining that the cell is usable for a second class of operation when the number of times that cell outputs of the cell are consistent is at least a second threshold number but fewer than the first threshold number.

8. The method of claim 7, wherein the device classification value is determined based on a number of cells determined to be usable for the second class of operation.

9. The method of claim 5, wherein the device classification value is determined based on a number of cells determined to be usable for the first class of operation.

10. The method of claim 1, further comprising:
determining that the cell is unusable when the number of times that cell outputs of the cell are consistent is fewer than a threshold number; and
storing a mask in a computer-readable memory that identifies unusable cells.

11. The method of claim 10, wherein the threshold number is based on the device classification value.

12. The method of claim 10, further comprising determining a device signature based on usable cells using the mask.

13. The method of claim 12, further comprising utilizing the device signature by:
transmitting the device signature from a device to identify the device,
signing a communication from the device using the device signature, or
encrypting a communication from the device using the device signature.

14. The method of claim 13, further comprising appending one or more error correction bits to reconstruct the device signature prior to utilizing the device signature.

15. A device comprising:
a plurality of cells, wherein, under a first condition of a plurality of conditions, a cell is configured to receive a first signal from a first wordline at a gate terminal of a first transistor of a first branch of the cell and a second signal from a second wordline at a gate terminal of a second transistor of a second branch of the cell; and
an analyzer configured to determine a device classification value, wherein the analyzer is configured to determine a number of times that cell outputs of the cell are consistent under the plurality of conditions, and the device classification value is determined based on a comparison between the determined number of times and a threshold number or range, for the plurality of cells.

16. The device of claim 15, wherein, under a second condition of the plurality of conditions, the first branch is configured to receive a third signal and the second branch is configured to receive a fourth signal in synchronization with the third signal.

17. The device of claim 16, wherein the analyzer is further configured to determine a first cell output of the cell produced by the first signal and the second signal and a second cell output of the cell produced by the third signal and the fourth signal.

18. The device of claim 15, wherein the analyzer is further configured to determine that the cell is unusable when the number of times that cell outputs of the cell are consistent is fewer than a minimum threshold number.

19. The device of claim 18, wherein the minimum threshold number is based on a number of cell outputs of the cell.

20. A non-transitory computer-readable medium encoded with instructions for commanding one or more data processors to execute steps of a method, the steps comprising:
providing signals to a cell under a plurality of conditions;
under a first condition of the plurality of conditions, providing a first signal to a first wordline connected to a gate terminal of a first transistor of the cell and a second signal to a second wordline connected to a gate terminal of a second transistor of the cell;
determining a number of times that cell outputs of the cell are consistent under the plurality of conditions; and
determining a device classification value, based on a comparison between the determined number of times and a threshold number or range, for a plurality of cells.

* * * * *